(12) United States Patent
Pomerantz et al.

(10) Patent No.: US 6,772,245 B1
(45) Date of Patent: Aug. 3, 2004

(54) METHOD AND APPARATUS FOR OPTIMIZING DATA TRANSFER RATES BETWEEN A TRANSMITTING AGENT AND A RECEIVING AGENT

(75) Inventors: Gregory M. Pomerantz, New City, NY (US); David I. Poisner, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/538,357

(22) Filed: Mar. 29, 2000

(51) Int. Cl.⁷ .................................................. G06F 3/00
(52) U.S. Cl. ............................ 710/60; 710/29; 710/59; 709/233
(58) Field of Search ......................... 710/22, 29, 35, 710/59, 60, 61; 709/233

(56) References Cited

U.S. PATENT DOCUMENTS

| | | | | |
|---|---|---|---|---|
| 5,745,491 A | * | 4/1998 | Ando et al. | 370/428 |
| 6,167,029 A | * | 12/2000 | Ramakrishnan | 370/235 |
| 6,192,492 B1 | * | 2/2001 | Masiewicz et al. | 714/56 |
| 6,209,046 B1 | * | 3/2001 | Sato et al. | 710/22 |
| 6,292,098 B1 | * | 9/2001 | Ebata et al. | 340/506 |
| 6,526,022 B1 | * | 2/2003 | Chiu et al. | 370/229 |

* cited by examiner

Primary Examiner—Jeffrey Gaffin
Assistant Examiner—Eron Sorrell
(74) Attorney, Agent, or Firm—Blakely, Sokoloff, Taylor & Zafman LLP

(57) ABSTRACT

According to one aspect of the present invention, a method is provided in which a transmitting agent transfers data to a receiving agent at a specified transfer rate. Information relating to data transfer pauses requested by the receiving agent is maintained. The data transfer rate is dynamically adjusted based upon the pause information maintained.

29 Claims, 4 Drawing Sheets

US 6,772,245 B1

METHOD AND APPARATUS FOR OPTIMIZING DATA TRANSFER RATES BETWEEN A TRANSMITTING AGENT AND A RECEIVING AGENT

FIELD OF THE INVENTION

The present invention relates generally to the field of data transfer technology. More specifically, the present invention relates to an apparatus, method, and system for optimizing data transfer rates between a transmitting agent and a receiving agent.

BACKGROUND OF THE INVENTION

As computer devices and systems continue to advance and become more complex, effective and efficient techniques for transferring data between various components in computer systems have become more and more critical in system design and implementation. In particular, data transfer between an I/O device (e.g., a hard disk) and a host device (e.g., system memory) has been constantly examined and improved in order to improve the system's total performance and reliability. Data transfer between two components of a system, for example between an IDE device and a host, is typically accomplished via an interface that facilitates and controls the data transfer between the two components. The data transfer between the IDE device and the host can be performed at different transfer rates corresponding to different transfer modes in accordance with existing data transfer protocols (e.g., ATA, Ultra ATA, etc.). Ideally, to attain the best transfer performance, the data transfer between two system components (e.g., the IDE device and the host) should be performed at the fastest transmission rate that the device is capable of transmitting. In reality, however, it is not always possible to transfer data at the fastest possible transfer rate due to various reasons. One of the reasons is that the receiving agent may not have enough buffering capacity to receive all the data from the sending agent at the specified transfer rate. In this instance, the receiving agent would have to ask the sending agent to pause or temporarily suspend the data transfer until the receiving agent is able to receive more data from the sending agent. Another reason is that the receiving agent may be too busy performing other tasks that it cannot devote full attention and resources to process the data already received from the sending agent. In this instance, the receiving agent again would need to pause the data transfer from the sending agent until it is able to receive more data from the sending agent. In these instances, the various conditions that cause data transfer pauses may last so long or happen so frequently that the total transfer rate (i.e., the transfer rate taken into account all the delays due to transfer pauses) may be slower not only compared to the specified transfer rate (e.g., the fastest rate possible) but also compared to a next slower transfer rate that the sending device can transmit (e.g., the second fastest transfer rate, etc.). Specifically, the number of pauses and the duration of pauses occurred during a data transfer from a sending agent to a receiving agent may cause the total transfer rate to be slower than what could have been achieved in the next slower transfer mode according to existing data transfer protocols. On the other hand, system conditions (e.g., buffering capacity, processing power, resources, etc.) during a data transfer may be so good that the receiving agent would have been able to receive data at a faster transfer rate than the specified rate. In this instance, the total system performance is also penalized because data transfer is not performed at the rate that both the sending and receiving agents are capable of doing during that period of time. Therefore, transferring data at a fixed rate without considering the dynamic nature of the system performance conditions does not optimize the total system performance and usage of resources.

SUMMARY OF THE INVENTION

According to one aspect of the present invention, a method is provided in which a transmitting agent transfers data to a receiving agent at a specified transfer rate. Information relating to data transfer pauses requested by the receiving agent is maintained. The data transfer rate is dynamically adjusted based upon the pause information maintained.

BRIEF DESCRIPTION OF THE DRAWINGS

The features and advantages of the present invention will be more fully understood by reference to the accompanying drawings, in which.

DETAILED DESCRIPTION

In the following detailed description numerous specific details are set forth in order to provide a thorough understanding of the present invention. However, it will be appreciated by one skilled in the art that the present invention may be understood and practiced without these specific details.

In the discussion below, the teachings of the present invention are utilized to implement a method, apparatus, and a system for dynamically adjusting the data transfer rate between a transmitting agent and a receiving agent based upon information relating to pauses requested by the receiving agent. In one embodiment, the transmitting agent transfers data to the receiving agent at a transfer rate specified by the receiving agent. In one embodiment, the transfer rate specified by the receiving agent is the transfer rate corresponding to a particular transfer mode according to existing data transfer protocols such as ATA or Ultra ATA. During the data transfer between the transmitting agent and the receiving agent, information relating to pauses requested by the receiving agent is kept track of by either the receiving agent, or the transmitting agent, or both. Such information may include the number of pauses requested and/or the pause duration. The transfer rate of the transmitting agent may be adjusted based upon the pause information maintained. If the total transfer rate due to the pauses requested by the receiving agent is lower than the transfer rate corresponding to the next slower transfer mode, the transfer rate of the transmitting agent will be adjusted from the originally specified rate to the transfer rate for the next slower transfer mode. If the total transfer rate as determined based on the pause information maintained is lower than what the receiving could have been able to receive, the transfer rate of the transmitting agent will be increased to the transfer rate corresponding to the next faster transfer mode. The transfer rate of the transmitting agent may be periodically restored to the rate specified by the receiving agent. The teachings of the present invention are applicable to any scheme, method and system for transferring data between a storage device and a host that are compatible with the ATA or Ultra ATA data transfer protocols or standards. However, the teachings of the present invention are not limited to the ATA or Ultra ATA data transfer protocols and can also be applied to any other scheme, method, and system for data transfer between a receiving agent and a transmitting agent.

Figure 1:
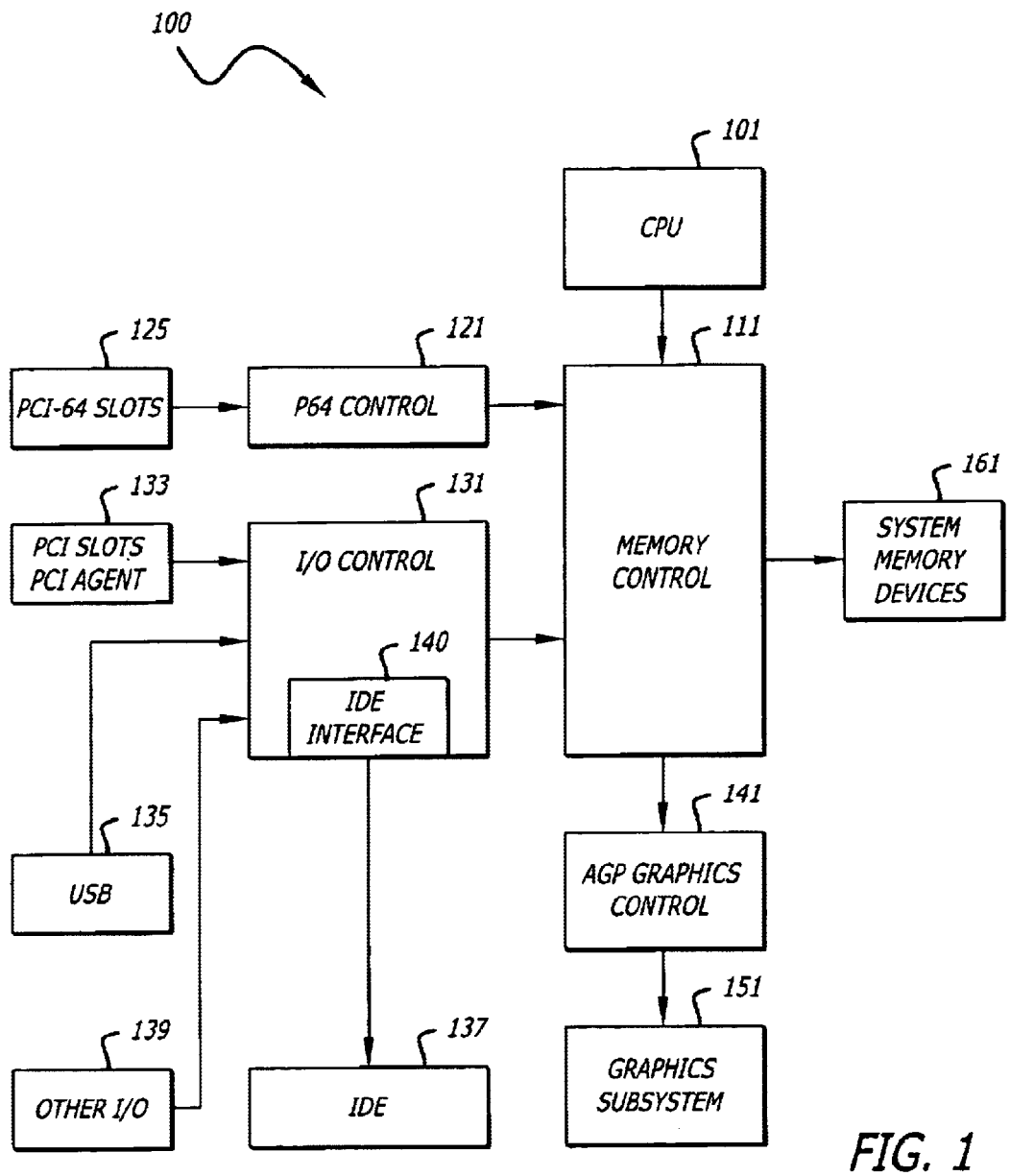
FIG. 1 is a block diagram of one embodiment of a system according to the teachings of the present invention.

FIG. 1 shows a block diagram of one embodiment of a system configuration in which the teachings of the present invention are implemented. The system configuration 100 includes one or more central processing unit (CPU) 101, a memory control hub (also referred to as memory control unit or memory controller) 111, a P64 control unit 121, an Input/Output (IO) control unit 131, a graphics controller 141 coupled to a graphics subsystem 151, and a plurality of system memory devices 161. For the purposes of the present specification, the term "processor" or "CPU" refers to any machine that is capable of executing a sequence of instructions and shall be taken to include, but not be limited to, general purpose microprocessors, special purpose microprocessors, multi-media controllers and microcontrollers, etc. In one embodiment, the CPU 101 is a general-purpose microprocessor that is capable of executing an Intel Architecture instruction set. The CPU 101, the P64 control unit 121, the IO control unit 131, and the AGP graphics control unit 141 access the system memory devices 161 via the memory control unit 111. The memory control unit 111, in one embodiment, is responsible for servicing all memory transactions that target the system memory devices 161. The memory control unit 111 can be a stand-alone unit, an integrated part of a chipset, or a part of some larger unit that control the interfaces between various system components and the system memory devices 161. The P64 control unit 121 provides the interface control between a plurality of PCI-64 slots 125 and the memory control unit 111. The IO control unit 131 provides the interface control between the memory control unit 111 and various IO devices and ports including the PCI slots and PCI agents 133, a plurality of USB ports 135, a plurality of IDE devices 137, and other IO devices 139. The IO control unit 131, in one embodiment, contains an IDE host interface unit 140 that controls the interface between the IDE devices 137 and the memory control unit 111. The AGP graphics control unit 141 provides the interface control between the graphics subsystem 151 and the memory control unit 111. The IDE host interface unit 140 can be a stand-alone unit, an integrated part of a chipset, or a part of some larger unit that controls the interfaces between various IDE devices 137 and the system memory devices 161. The structure and functions of the IDE host interface unit 140 are described in greater detail below. For the purposes of the present specification, the IDE devices 137 are assumed to be Ultra ATA or Ultra DMA compatible, i.e., capable of transferring data to the host in accordance with the Ultra ATA and Ultra DMA data transfer protocol.

Figure 2:
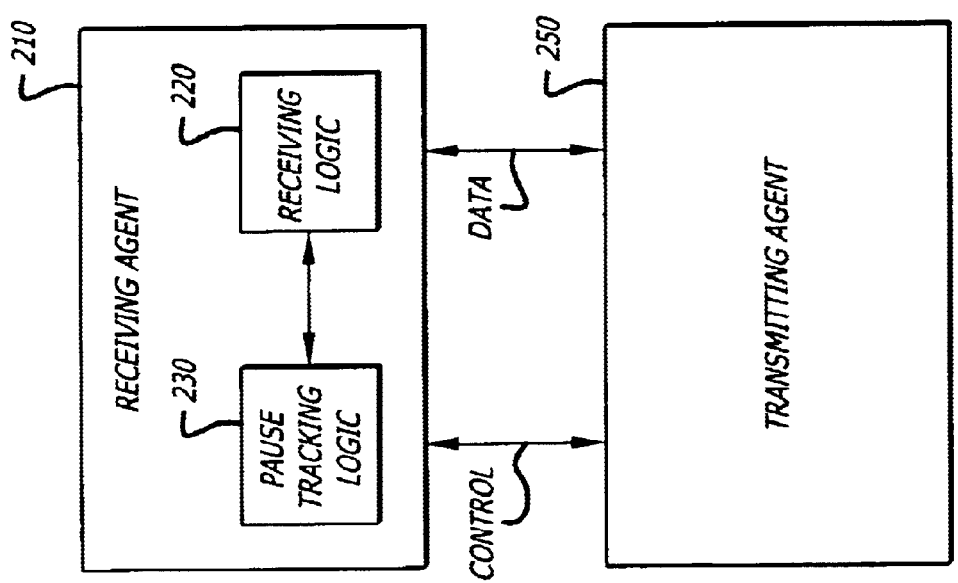
FIG. 2 shows a block diagram of one embodiment of a receiving agent according to the teachings of the present invention.

FIG. 2 shows a block diagram of one embodiment of a receiving agent having a mechanism to dynamically adjust the transfer rate according to the teachings of the present invention. In the present embodiment, the receiving agent 210 contains receiving logic 220 to receive data from a transmitting agent 250 and a pause tracking logic 230 to keep track of information relating to pauses requested by the receiving agent. For purposes of explanation and illustration, it is assumed in the present discussion that the receiving agent 210 is an IDE host interface unit and the transmitting agent 250 is an IDE device, as described above with respect to FIG. 1. Accordingly, it is assumed that the data transfer between the transmitting agent 250 and the receiving agent 210 is performed according to existing ATA or Ultra ATA data transfer protocols. However, it should be appreciated and understood by one skilled in the art that the teachings of the present invention are not limited to data transfer between IDE interfaces and IDE devices. Likewise, the teachings of the present invention are not limited to ATA or Ultra ATA data transfer protocols. Continuing with present discussion, the receiving agent 210 can issue a read request to the transmitting agent to instruct the transmitting agent to transfer a specified amount of data to the receiving agent at a specified transfer rate corresponding to a specified transfer mode. For example, the receiving agent 210 can issue a DMA read command to the transmitting agent 250 to instruct the transmitting agent 250 to transfer data according to DMA mode 2 (which is about 33 Mbytes/sec based on Ultra DMA/33 specifications). The transmitting agent 250, in response to the DMA read command, will initially transfer data at the specified rate. As explained above, data transfer at the specified rate may not be possible due to various conditions that may affect the ability of the receiving agent to receive data at the specified rate. For example, the receiving agent may not have sufficient buffer capacity to receive data at the specified rate for this particular transfer request. As such, the receiving agent 210 would need to request the transmitting agent 250 to pause the data transfer until the receiving agent 210 is able to receive more data. For example, according to existing Ultra ATA/DMA protocol, the receiving agent (i.e., the host) in this case can pause the data in burst by negating a DMA ready signal (HDMARDY). In response to the HDMARDY signal being negated by the receiving agent 210, the transmitting agent 250 will stop its toggling of a STROBE (DSTROBE) signal within a predetermined period of time after the HDMARDY signal is negated to temporarily suspend or pause the data transfer. The receiving agent 210, when ready to resume the data transfer, will assert the HDMARDY signal to let the transmitting agent 250 know that it is ready to receive data again. Depending on the performance conditions of the receiving agent 210, the number of pauses requested and duration of these pauses may be such that the total transfer rate (taken into account the delay caused by the pauses) would be lower than the transfer rate for the next slower DMA mode (e.g., DMA mode 1). In this instance, it would be more efficient for the transmitting agent 250 to transmit data to the receiving agent 210 at the lower transfer rate corresponding to the next slower DMA mode (DMA mode 1). In the present embodiment, the pause tracking logic 230 implemented in the receiving agent 210 is responsible for keeping track of the information relating to pauses requested by the receiving agent 210 including the number of pauses requested and the pause duration, etc. In one embodiment, the total transfer rate is determined based on the pause information maintained by the pause tracking logic 230. If this total transfer rate falls below a threshold level (e.g., the rate for the next slower transfer mode), the pause tracking logic can signal the receiving logic 220 to take appropriate actions to request the transmitting agent 250 to adjust the transfer rate accordingly. For example, in the case of data transfer between an IDE host interface and an IDE device according to ATA protocol, the host interface can fully terminate the current data burst and issue a "SET FEATURES" command with a "SET TRANSFER MODE" subcommand to set the IDE device to a slower mode. In one embodiment, the host interface hardware may issue this command directly without waiting for software intervention (this would require modification to existing ATA specification to allow for interruption of an IDE command in order to change the transfer mode). In one embodiment, the receiving agent 210 may periodically restore the transfer rate to the specified rate (e.g., the software programmed ATA mode). When and how often the receiving agent 210 may restore the transfer mode to the software-programmed mode can vary depending on various implementations and applications of the present invention. It can be appreciated based on the above description that the teachings of the present invention can be implemented to optimize the data transfer rate in order to improve the total system performance.

Figure 3:
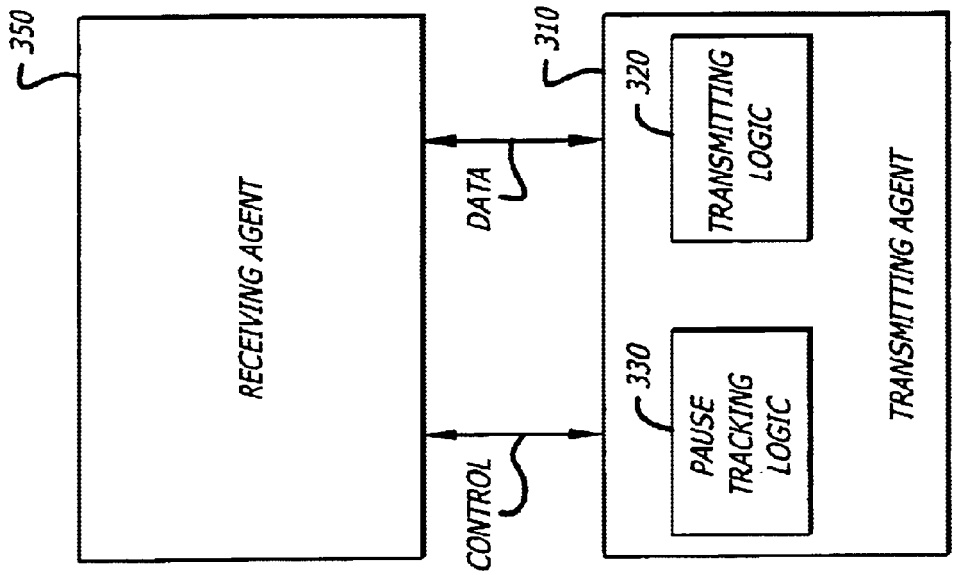
FIG. 3 shows a block diagram of one embodiment of a transmitting agent according to the teachings of the present invention.

FIG. 3 shows a block diagram of one embodiment of a transmitting agent having a mechanism to dynamically adjust the transfer rate according to the teachings of the present invention. In the present embodiment, the transmitting agent 310 contains transmitting logic 320 to transmit data to a receiving agent 350 and a pause tracking logic 330 to keep track of information relating to pauses requested by the receiving agent. For purposes of explanation and illustration, it is assumed in the present discussion that the receiving agent 350 is an IDE host interface unit and the transmitting agent 310 is an IDE device, as described above with respect to FIG. 1. Accordingly, it is assumed that the data transfer between the transmitting agent 310 and the receiving agent 350 is performed according to existing ATA or Ultra ATA data transfer protocols. However, it should be appreciated and understood by one skilled in the art that the teachings of the present invention are not limited to data transfer between IDE interfaces and IDE devices. Likewise, the teachings of the present invention are not limited to ATA or Ultra ATA data transfer protocols. Continuing with present discussion, the receiving agent 350 can issue a read request to the transmitting agent 310 to instruct the transmitting agent 310 to transfer a specified amount of data to the receiving agent 350 at a specified transfer rate corresponding to a specified transfer mode. For example, the receiving agent 350 can issue a DMA read command to the transmitting agent 310 to instruct the transmitting agent 310 to transfer data according to DMA mode 2 (which is about 33 Mbytes/sec based on Ultra DMA/33 specifications). The transmitting agent 310, in response to the DMA read command, will initially transfer data at the specified rate. As explained above, data transfer at the specified rate may not be possible due to various conditions that may affect the ability of the receiving agent to receive data at the specified rate. For example, the receiving agent may not have sufficient buffer capacity to receive data at the specified rate for this particular transfer request or may be too busy with other tasks. As such, the receiving agent 350 would need to request the transmitting agent 310 to pause the data transfer until the receiving agent 350 is able to receive more data. For example, according to existing Ultra ATA/DMA protocol, the receiving agent (i.e., the host) in this case can pause the data in burst by negating a DMA ready signal (HDMARDY). In response to the HDMARDY signal being negated by the receiving agent 350, the transmitting agent 310 will stop its toggling of a STROBE (DSTROBE) signal within a predetermined period of time after the HDMARDY signal is negated to temporarily suspend or pause the data transfer. The receiving agent 350, when ready to resume the data transfer, will assert the HDMARDY signal to let the transmitting agent 310 know that it is ready to receive data again. Because of the pauses requested by the receiving agent 350, the total transfer rate (taken into account the delay caused by the pauses) may be lower than the transfer rate for the next slower DMA mode (e.g., DMA mode 1). In this instance, it would be more efficient for the transmitting agent 310 to transmit data to the receiving agent 350 at a lower transfer rate corresponding to the next slower DMA mode (DMA mode 1). In the present embodiment, the pause tracking logic 330 implemented in the transmitting agent 310 is responsible for keeping track of the information relating to pauses requested by the receiving agent 350 including the number of pauses requested and the pause duration, etc. In one embodiment, the total transfer rate is determined based on the pause information maintained by the pause tracking logic 330. If this total transfer rate falls below a threshold level (e.g., the transfer rate for the next slower transfer mode), the pause tracking logic 330 can signal the transmitting logic 320 so that the transmitting logic can adjust the transfer rate to a lower rate corresponding to the next slower transfer mode. Alternatively, in response to the determination that the total transfer is lower than the specified rate due to pauses, the transmitting agent can be configured to send data at an intermediate rate between the two defined transfer modes, either by slowing down the frequency of the data transfer STROBE signal or by inserting delays intermittently during an otherwise full speed transfer. In one embodiment, the transmitting agent 310 may periodically restore the transfer rate to the specified rate (e.g., the software programmed ATA mode). When and how often the receiving agent 310 may restore the transfer mode to the software-programmed mode can vary depending on various implementations and applications of the present invention. Restoring the transfer rate to the software-programmed mode can be useful especially in the case where the throughput or latency degradation in the system is temporary. Whether the teachings of the present invention are implemented on the receiving side or on the transmitting side, the system total performance can be improved through dynamic adjustment of the transfer rate to match the transfer rate with the total system throughput.

Figure 4:
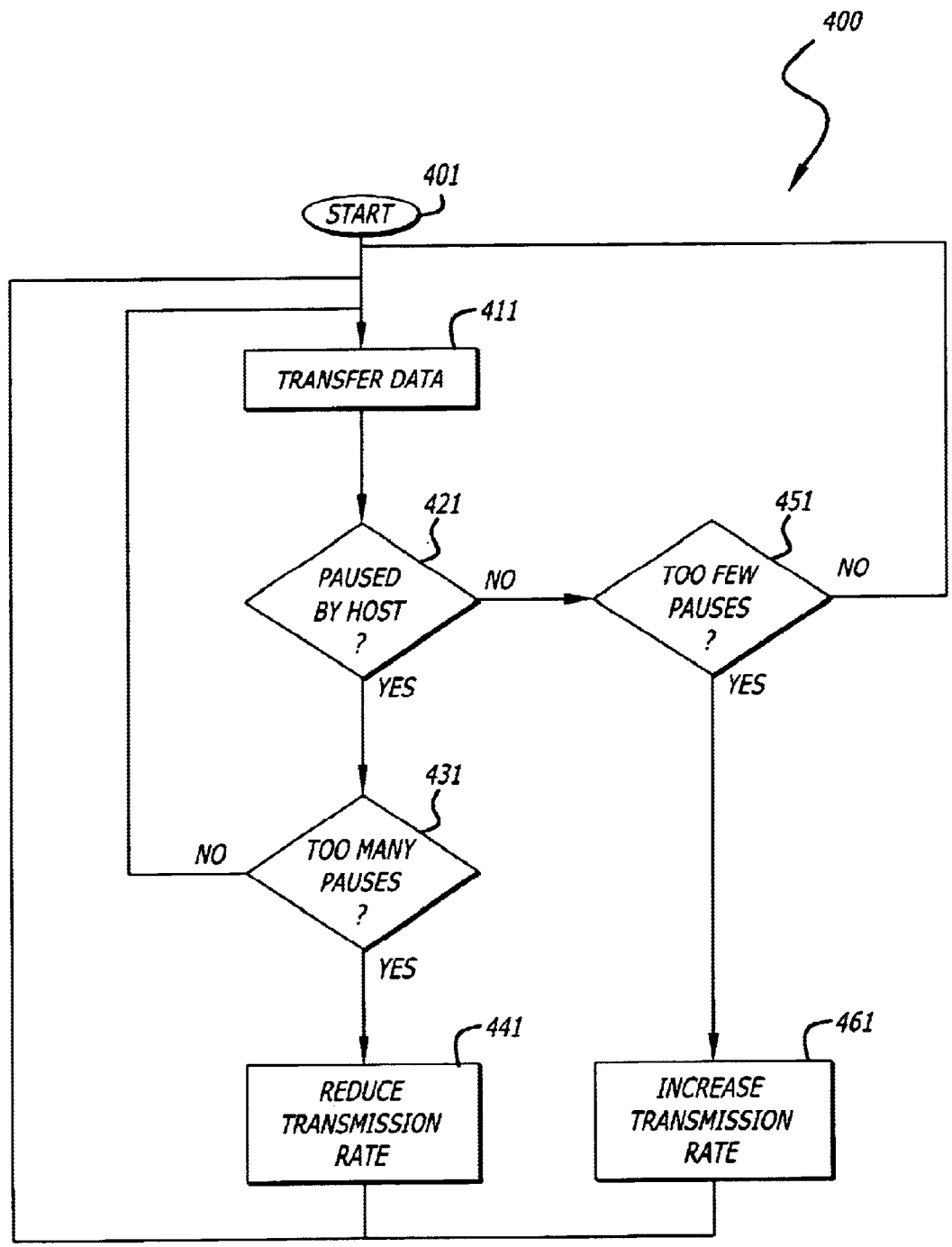
FIG. 4 shows a flow diagram of one embodiment of a method of transferring data in accordance with the teachings of the present invention.

FIG. 4 illustrates a flow diagram of one embodiment of a method 400 for dynamically adjusting the transmission rate of a transmitting agent based upon the information relating to pauses requested by a receiving agent. The method starts at block 401 and proceeds to block 411. At block 411, the transmitting agent (e.g., an IDE device) transfers data to the receiving agent (e.g., an IDE host interface) in response to a read request issued by the receiving agent. At decision block 421, if the data transfer is paused by the receiving agent, the method 400 proceeds to block 431, otherwise the method 400 proceeds to block 451. As described above, when the data transfer is performed according to existing ATA protocols, the receiving agent can request a pause by negating a control signal (e.g., the HMDARDY signal). In response to the negation of the HDMARDY signal, the transmitting agent will stop toggling the DSTROBE signal to temporarily pause the data in burst. At decision block 431, the method 400 proceeds to block 441 if "too many" pauses have occurred. Otherwise the method 400 loops back to block 411 to continue the data transfer. In one embodiment, determining whether too many pauses have occurred may include keeping track of the number of pauses and the duration of pauses. In one embodiment, the number of pauses occurred can be compared with a threshold number to determine whether too many pauses have occurred. In another embodiment, the total pause duration can be compared with another threshold number to determine whether there have been too many pauses during the data transfer. Alternatively, the total transfer rate taken into account the pause duration can be calculated and compared with a specified transfer rate to determine whether too many pauses have occurred (i.e., whether the transfer rate should be reduced due to pauses). In this instance, the total transfer rate for any period of time can be calculated based upon the number of words transferred during that period of time. This total transfer rate can be compared with a specified transfer rate to determine whether the transmitting agent should reduce the transfer rate. Continuing with the present discussion, at decision block 451, the method 400 proceeds to block 461 to increase the transmission rate if there have been too few pauses. Otherwise the method 400 loops back to block 411 to continue the data transfer. The criteria for determining whether too few pauses have occurred can also vary depending on the specific implementations and applications of the present invention. In one embodiment, the number of pauses detected can be compared with a threshold number to determine whether there have been too few pauses. In another embodiment, the duration of the pauses can be compared with another threshold number to determine whether too few pauses have occurred. Alternatively, the total transfer rate taken into account the pause information can be calculated and compared with a threshold transfer rate to determine whether there have been too few pauses (i.e., whether the transmission rate should be increased).

Figure 5:
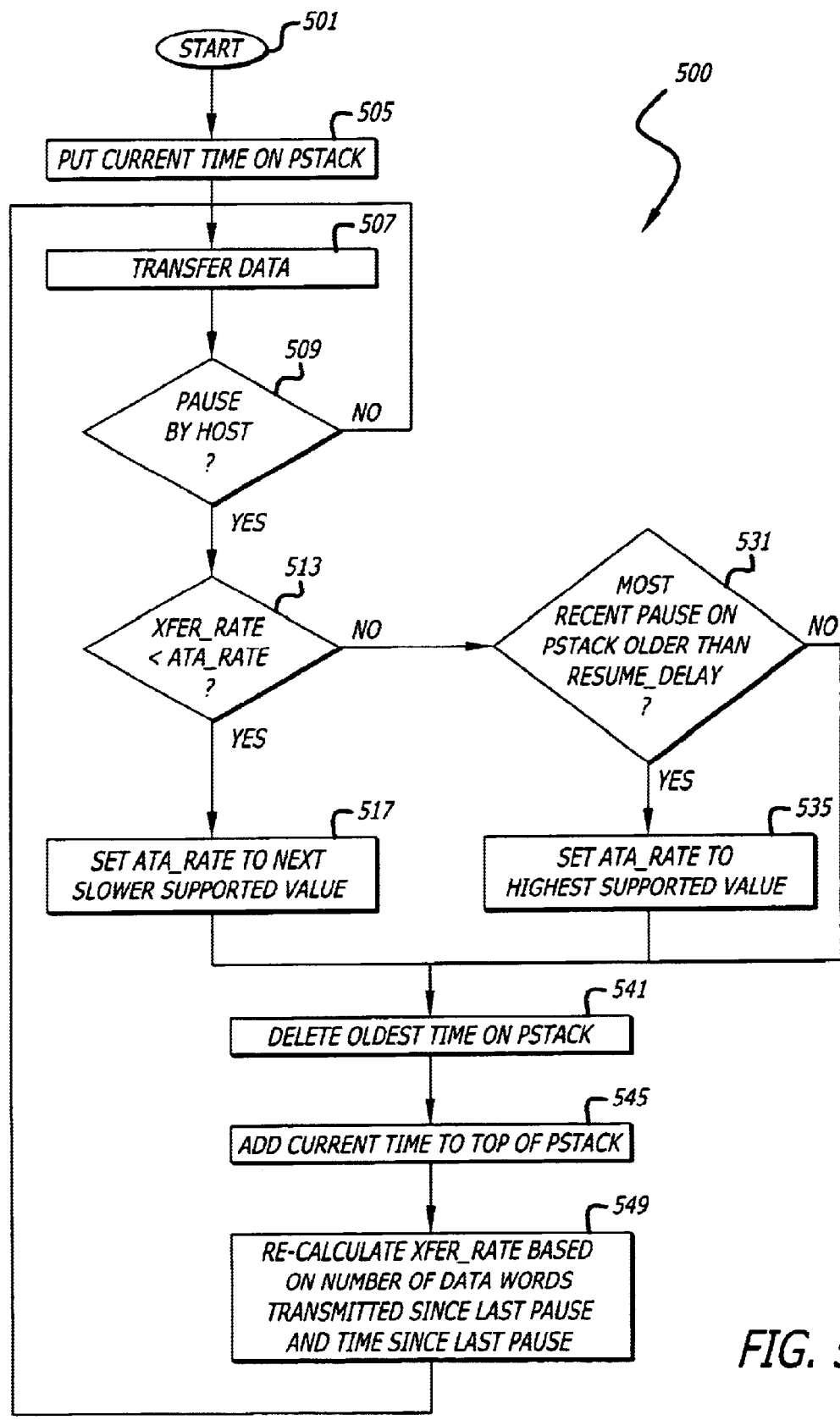
FIG. 5 illustrates a flow diagram of one embodiment of a method for dynamically adjusting the transfer rate according to the teachings of the present invention.

FIG. 5 illustrates a flow diagram of a method 500 for dynamically adjusting the transfer rate according one embodiment of the present invention. In this embodiment, a stack (referred to as PSTACK) is used to keep track of the information relating to pauses requested by the receiving agent. In one embodiment, the PSTACK is the stack of time values with three entries. It should be appreciated and understood by one skilled in the art that other data structures such as list, arrays, etc. can also be used to keep track of the information relating to pauses requested by the receiving agent. The XFER_RATE, in one embodiment, is defined as the cumulative data transfer rate since the first pause on PSTACK. The ATA_RATE is defined as the current Ultra ATA/DMA data transfer rate. In the present embodiment, RESUME_DELAY is a time value that indicates when the Ultra DMA transfer rate will be restored to the maximum value.

Continuing with the present discussion, the method 500 starts at block 501 and proceeds to block 505 to put the current time on the PSTACK. At block 507, data is transferred from the transmitting agent to the receiving agent. At decision block 509, the method 500 proceeds to block 513 if the data in burst is paused by the receiving agent (i.e., the host), otherwise the method 500 loops back to block 507 to continue the data transfer. At decision block 513, the method 500 proceeds to block 517 if the cumulative transfer rate XFER_RATE is lower than the current ATA_RATE. Otherwise the method 500 proceeds to block 531. At block 517, the ATA_RATE is set to the next slower supported value (e.g., adjust ATA_RATE one level down). At decision block 531, the method 500 proceeds to block 535 if the most recent pause on PSTACK is older than the RESUME_DELAY. Otherwise the method 500 proceeds to block 541. At block 541, the oldest time of PSTACK is deleted. At block 545, the current time is added to top of PSTACK. At block 549, the XFER_RATE is re-calculated based on the number of data words sent since the last pause and the time that has elapsed since the last pause. The method 500 then loops back to block 507 to continue the data transfer.

The invention has been described in conjunction with the preferred embodiment. It is evident that numerous alternatives, modifications, variations and uses will be apparent to those skilled in the art in light of the foregoing description.

What is claimed is:

1. A method to be performed by a transmitting agent, the method comprising:

transferring data to a receiving agent at a data transfer rate that corresponds to a first transfer mode of a transfer protocol as specified by the receiving agent;

maintaining pause information relating to pauses requested by the receiving agent to pause the data transfer until the receiving agent is able to receive more data; and adjusting the data transfer rate based upon the pause information maintained indicating a total transfer rate less than the data rate that corresponds to a second transfer mode of the transfer protocol.

2. The method of claim 1 wherein maintaining comprises:

keeping track of the number of pauses occurred during the data transfer.

3. The method of claim 2 wherein maintaining further comprising:

keeping track of the duration of pauses.

4. The method of claim 1 wherein adjusting comprises:

increasing the data transfer rate if the number of pauses detected does not exceed a first predetermined number.

5. The method of claim 1 wherein adjusting comprises:

decreasing the data transfer rate if the number of pauses detected exceeds a second predetermined number.

6. The method of claim 1 wherein adjusting further comprises:

increasing the data transfer rate to correspond to the first transfer mode of the transfer protocol if a total transfer rate taken into account the pauses is not lower than a first threshold level.

7. The method of claim 1 wherein adjusting comprises:

decreasing the data transfer rate to correspond to the second transfer mode of the transfer protocol if a total transfer rate taken into account the pauses is not higher than a second threshold level.

8. The method of claim 1 further comprising:

periodically restoring the data transfer rate to a specified rate.

9. An IDE device comprising:

logic to keep track of pause information relating to pauses requested by a host during a data transfer from the IDE device to the host at a data transfer rate that corresponds to a first transfer mode of a transfer protocol as specified by the host, the pauses to pause the data transfer until the host is able to receive more data; and logic to adjust the data transfer rate to correspond to a second transfer mode of the transfer protocol when the pause information indicates a total transfer rate less than the data rate that corresponds to the second transfer mode of the transfer protocol.

10. The IDE device of claim 9 wherein the logic to keep track of pause information comprises:

logic to detect pauses requested by the host; and logic to keep track of the number of pauses requested by the host.

11. The IDE device of claim 10 wherein the logic to keep track of pause information further comprising:
   logic to keep track of the duration of pauses.

12. The IDE device of claim 9 wherein the logic to adjust comprises:
   logic to increase the data transfer rate based upon the pause information.

13. The IDE device of claim 9 wherein the logic to adjust comprises:
   logic to decrease the data transfer rate based upon the pause information.

14. The IDE device of claim 9 wherein the logic to adjust further comprises:
   logic to send data at an intermediate rate between a first rate corresponding to the first transfer mode and a second rate corresponding to the second transfer mode by slowing down a frequency of a data transfer strobe signal.

15. The IDE device of claim 14 wherein logic to send data at the intermediate rate comprises:
   logic to adjust the frequency of a data transfer strobe signal.

16. The IDE device of claim 9 further comprising:
   logic to periodically restore the data transfer rate to a specified transfer rate corresponding to a specified transfer mode.

17. An interface comprising:
   logic to maintain pause information relating to pauses occurred during a data transfer from a device to a host at a data transfer rate that corresponds to a first transfer mode of a transfer protocol as specified by the host, the pauses to pause the data transfer until the host is able to receive more data; and
   logic to adjust the data transfer rate of the device to correspond to a second transfer mode of the transfer protocol when the pause information indicates a total transfer rate less than the data rate that corresponds to the second transfer mode of the transfer protocol.

18. The interface of claim 17 wherein logic to maintain pause information comprises:
   logic to keep track of a number of pauses caused by insufficient buffer memory to receive incoming data from the device.

19. The interface of claim 18 wherein logic to maintain pause information comprises:
   logic to keep track of the duration of pauses.

20. The interface of claim 17 wherein logic to adjust the data transfer rate comprises:
   logic to increase the data transfer rate based on the pause information maintained.

21. The interface of claim 17 wherein logic to adjust the data transfer rate comprises:
   logic to decrease the data transfer rate based upon the pause information maintained.

22. The interface of claim 17 wherein the logic to adjust comprises:
   logic to terminate the current data in burst and set the device to another transfer mode.

23. The interface of claim 17 further comprising:
   logic to periodically restore the data transfer rate to a rate corresponding to a transfer mode specified by a host.

24. A system comprising:
   a host;
   an interface coupled to the host; and
   a storage device coupled to the interface to transfer data to the host via the interface at a data transfer rate that corresponds to a first transfer mode of a transfer protocol as specified by the host, the data transfer rate being dynamically adjusted by one of the interface and the storage device based upon requests by the host to pause the data transfer until the host is able to receive more data that cause a total transfer rate to be less than the data rate that corresponds to a second transfer mode of the transfer protocol.

25. The system of claim 24 comprising:
   logic to maintain pause information.

26. The system of claim 24 comprising:
   logic to adjust the data transfer rate based upon the pause information maintained.

27. The system of claim 24 wherein the interface is responsible for maintaining pause information and to cause the data transfer rate to be adjusted based upon the pause information maintained.

28. The system of claim 24 wherein the storage device is responsible for maintaining pause information and to adjust the data transfer rate based upon the pause information maintained.

29. The system of claim 24 wherein data transfer between the device and the host is performed according to the Advanced Technology Attachment (ATA) data transfer protocol.

* * * * *